United States Patent
Tieu et al.

(10) Patent No.: US 9,946,917 B2
(45) Date of Patent: Apr. 17, 2018

(54) EFFICIENT DETERMINATION OF BIOMETRIC ATTRIBUTE FOR FAST REJECTION OF ENROLLED TEMPLATES AND OTHER APPLICATIONS

(71) Applicant: Synaptics Incorporated, San Jose, CA (US)

(72) Inventors: Kinh Tieu, San Jose, CA (US); Bob Lee Mackey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 254 days.

(21) Appl. No.: 15/086,906

(22) Filed: Mar. 31, 2016

(65) Prior Publication Data

US 2017/0286746 A1    Oct. 5, 2017

(51) Int. Cl.
  *G06K 9/00*    (2006.01)
  *G06K 9/68*    (2006.01)

(52) U.S. Cl.
  CPC ........... *G06K 9/0008* (2013.01); *G06K 9/001* (2013.01); *G06K 9/685* (2013.01)

(58) Field of Classification Search
  CPC ........... G06K 9/00006; G06K 9/00067; G06K 9/00073; G06K 9/0008; G06K 9/00087; G06K 9/00093; G06K 9/001
  See application file for complete search history.

(56) References Cited

U.S. PATENT DOCUMENTS

| | | | |
|---|---|---|---|
| 6,718,052 B1* | 4/2004 | Matsumoto | G06K 9/00067 382/125 |
| 2003/0063782 A1* | 4/2003 | Acharya | G06K 9/00067 382/125 |
| 2003/0103659 A1* | 6/2003 | Hara | G06K 9/00067 382/125 |
| 2004/0230810 A1 | 11/2004 | Hillhouse | |
| 2005/0254693 A1 | 11/2005 | Harkless et al. | |

(Continued)

OTHER PUBLICATIONS

Liang et al., "Applying Computational Geometry on Fingerprint Recognition" IECE Trans. Inf. & Syst., VALE89-D, No. 4 Apr. 2000.

(Continued)

*Primary Examiner* — Wesley J Tucker
(74) *Attorney, Agent, or Firm* — Leydig, Voit & Mayer, Ltd.

(57) ABSTRACT

A biometric input system includes: a biometric sensor, configured to generate a biometric image comprising features of an input biometric object; and a processing system, configured to receive the biometric image, generate a feature map from the biometric image, perform a distance transform on the feature map, and determine an attribute of the biometric image from the distance transform. The processing system is further configured to compare the determined attribute of the biometric image with corresponding attributes of enrolled biometric images, and, based on the comparison, to eliminate enrolled biometric images from a matching process for the biometric image, wherein the matching process is performed after the elimination and comprises comparison of the biometric image to remaining enrolled biometric images based on one or more attributes of the biometric image other than the determined attribute.

20 Claims, 6 Drawing Sheets

(56) References Cited

U.S. PATENT DOCUMENTS

| | | | |
|---|---|---|---|
| 2006/0110015 A1* | 5/2006 | Rowe | G06K 9/00013 |
| | | | 382/124 |
| 2007/0189586 A1* | 8/2007 | Monden | G06K 9/0008 |
| | | | 382/124 |
| 2008/0144894 A1 | 6/2008 | Bichigov et al. | |
| 2010/0119126 A1* | 5/2010 | Rane | G06K 9/00067 |
| | | | 382/125 |
| 2010/0266168 A1 | 10/2010 | Wang et al. | |
| 2011/0150303 A1 | 6/2011 | Dinerstein et al. | |
| 2013/0051638 A1* | 2/2013 | Monden | A61L 35/1172 |
| | | | 382/125 |
| 2015/0220771 A1* | 8/2015 | Thiebot | G06K 9/00013 |
| | | | 382/125 |
| 2016/0110583 A1* | 4/2016 | Kuo | G06K 9/00093 |
| | | | 382/125 |

OTHER PUBLICATIONS

Yin et al., "Ridge Distance Estimation in Fingerprint Images: Algorithm and Performance Evaluation" EURASIP Journal on Applied Signal Processing 2004 (8 pages).

Liang et al., "A Linear Time Algorithm for Binary Fingerprint Image Denoising Using Distance Transform" IEICE Trans. Inf. & Syst., vol. E89-D, Apr. 2006 (10 pages).

\* cited by examiner

EFFICIENT DETERMINATION OF BIOMETRIC ATTRIBUTE FOR FAST REJECTION OF ENROLLED TEMPLATES AND OTHER APPLICATIONS

BACKGROUND

Latency is a critical concern for the user experience with respect to biometric identification and verification, as long waiting times lead to user frustration. For example, in fingerprint matching, an image obtained during a verification attempt is often compared to multiple enroll templates, such as one for each of ten digits for one or more authorized users. In an identification operation, an image obtained during an identification attempt may be compared to a large number of enroll templates, such as enroll templates corresponding to many potential individuals from a database. For small sensors which take a partial view of the biometric object, even a single template may itself include multiple views that are each compared to the new image. In any of these situations, match speed is correlated to the number of comparisons, and having to perform a large number of comparisons may result in a high level of latency.

SUMMARY

In an embodiment, a biometric input system includes: a biometric sensor, configured to generate a biometric image comprising features of an input biometric object; and a processing system, configured to receive the biometric image, generate a feature map from the biometric image, perform a distance transform on the feature map, and determine an attribute of the biometric image from the distance transform; wherein the processing system is further configured to compare the determined attribute of the biometric image with corresponding attributes of enrolled biometric images, and, based on the comparison, to eliminate enrolled biometric images from a matching process for the biometric image, wherein the matching process is performed after the elimination and comprises comparison of the biometric image to remaining enrolled biometric images based on one or more attributes of the biometric image other than the determined attribute.

In an embodiment, a biometric input method includes: obtaining, by a processing system, a biometric image of an input biometric object; generating a feature map from the biometric image, performing a distance transform on the feature map; determining an attribute of the biometric image from the distance transform; comparing the determined attribute of the biometric image with corresponding attributes of enrolled biometric images; and, based on the comparison, eliminating enrolled biometric images from a matching process for the biometric image, wherein the matching process is performed after the elimination and comprises comparison of the biometric image to remaining enrolled biometric images based on one or more attributes of the biometric image other than the determined attribute.

In an embodiment, a non-transitory, computer-readable medium includes processor-executable instructions stored thereon for biometric input, the processor-executable instructions, when executed, facilitating performance of the following: generating a feature map from an input biometric image corresponding to an input biometric object, performing a distance transform on the feature map; determining an attribute of the biometric image from the distance transform; comparing the determined attribute of the biometric image with corresponding attributes of enrolled biometric images; and, based on the comparison, eliminating enrolled biometric images from a matching process for the biometric image, wherein the matching process is performed after the elimination and comprises comparison of the biometric image to remaining enrolled biometric images based on one or more attributes of the biometric image other than the determined attribute.

In an embodiment, a biometric input system includes: a biometric sensor, configured to generate a biometric image comprising features of an input biometric object; and a processing system, configured to receive the biometric image, generate a skeletonized ridge representation of the input biometric object based on the obtained biometric image, perform a distance transform on the skeletonized ridge representation to determine a distance-to-nearest-ridge for each pixel of the skeletonized ridge representation, identify local maxima based on the performed distance transform, and determine an attribute of the biometric image based on the performed distance transform and the identified local maxima.

In an embodiment, a biometric input method includes: obtaining, by a processing system, a biometric image of an input biometric object; generating, by the processing system, a skeletonized ridge representation of the input biometric object based on the obtained biometric image; performing, by the processing system, a distance transform on the skeletonized ridge representation to determine a distance-to-nearest-ridge for each pixel of the skeletonized ridge representation; identifying local maxima based on the performed distance transform; and determining an attribute of the biometric image based on the performed distance transform and the identified local maxima.

In an embodiment, a non-transitory, computer-readable medium includes processor-executable instructions stored thereon for biometric input, the processor-executable instructions, when executed, facilitating performance of the following: generating a skeletonized ridge representation of an input biometric image corresponding to an input biometric object; performing a distance transform on the skeletonized ridge representation to determine a distance-to-nearest-ridge for each pixel of the skeletonized ridge representation; identifying local maxima based on the performed distance transform; and determining an attribute of the biometric image based on the performed distance transform and the identified local maxima.

BRIEF DESCRIPTION OF THE SEVERAL VIEWS OF THE DRAWINGS

Examples of embodiments will be described in even greater detail below based on the figures. The invention is not limited to these examples. All features described and/or illustrated herein can be used alone or combined in different combinations in various embodiments. Features and advantages of various embodiments will become apparent by reading the following detailed description with reference to the attached drawings, which illustrate the following.

DETAILED DESCRIPTION

The following detailed description is by way of example and is not intended to limit the disclosure or the application and uses of the disclosure. Furthermore, there is no intention to be bound by any expressed or implied theory presented in the preceding technical field, background, summary, brief description of the drawings, or the following detailed description.

In various embodiments, a technique for quickly rejecting reference templates ("enrolled" images) in a biometric matching process is provided. The technique includes determining an attribute of an input biometric image (e.g., a ridge spacing-related attribute) that is compared to a corresponding attribute of the reference templates to provide a quick rejection of reference templates using a minimal amount of information, and without engaging in a full-on comparison of the input biometric image to the rejected reference templates. In further embodiments, the determined attribute may be used for other applications, such as determining demographic information regarding the individual associated with the input biometric object (e.g., age, gender or ethnicity) or determining contextual information about the input biometric image (e.g., for a full or partial view of a fingerprint, determining which finger(s) the input biometric image was taken from or potentially taken from; and/or, for a partial view of a fingerprint, determining a localized region of a fingerprint from which the input biometric image was taken from or potentially taken from).

Figure 1:
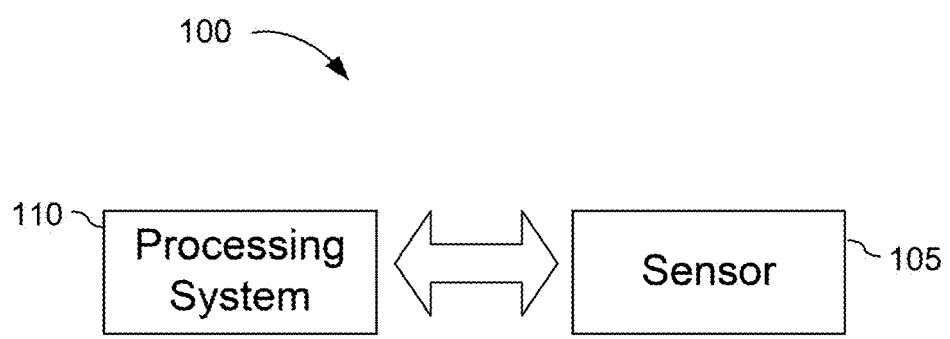
FIG. 1 is a block diagram of an example of an input device.

FIG. 1 is a block diagram of an example of an input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional example electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, a sensor 105 is included with the input device 100. The sensor 105 comprises one or more sensing elements configured to sense input provided by one or more input objects in a sensing region. Examples of input objects include fingers and hands. Sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 may utilize any suitable combination of sensor components and sensing technologies to detect user input in the sensing region. Some implementations utilize arrays or other regular or irregular patterns of multiple sensing elements to detect the input. Exemplary sensing techniques that the input device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

For example, the input device 100 may use resistive sensing techniques where contact from an input object closes an electrical circuit and can be used to detect input. In one exemplary technique, the sensor 105 includes a flexible and conductive first layer separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine spatial information corresponding to the input object.

In another example, the input device 100 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the input device 100 may use acoustic sensing techniques where one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One exemplary acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or common elements that both transmit and receive may be used (e.g., ultrasonic transceivers). In some instances, emitted ultrasonic waves are able to penetrate sub-surfaces of the input object, such as dermal layers of a human finger.

In another example, the input device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, photodiodes, and other suitable photosensors sensitive to light in wavelength(s) of interest. Active illumination may be used to provide light to the sensing region, and reflections from the sensing region in the illumination wavelength(s) may be detected to determine input information corresponding to the input object.

One exemplary optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another exemplary optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the input device 100 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

One exemplary technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another exemplary technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device and/or receiver circuitry configured to receive resulting signals with the sensing hardware. For example, a processing system for a mutual capacitance sensor device may comprise transmitter circuitry configured to transmit signals with one or more transmitter sensor electrodes of the sensor 105, and/or receiver circuitry configured to receive resulting signals with one or more receiver sensor electrodes of the sensor 105. As another example, a processing system for a self capacitance sensor device may comprise driver circuitry configured to drive absolute capacitance signals onto one or more sensor electrodes of the sensor 105, and/or receiver circuitry configured to receive resulting signals with the same or different sensor electrodes of the sensor 105. As a further example, a processing system for an ultrasonic sensor device may comprise driver circuitry configured to drive acoustic signals with ultrasonic transmitter elements, and/or receiver circuitry configured to receive signals with ultrasonic receiving elements. As a yet further example, a processing system for an optical sensor device may comprise driver circuitry configured to drive illumination signals to one or more LEDs or other light sources, and/or receiver circuitry configured to receive signals with optical receiving elements.

The processing system 110 may include electronically-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for TFT circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2:
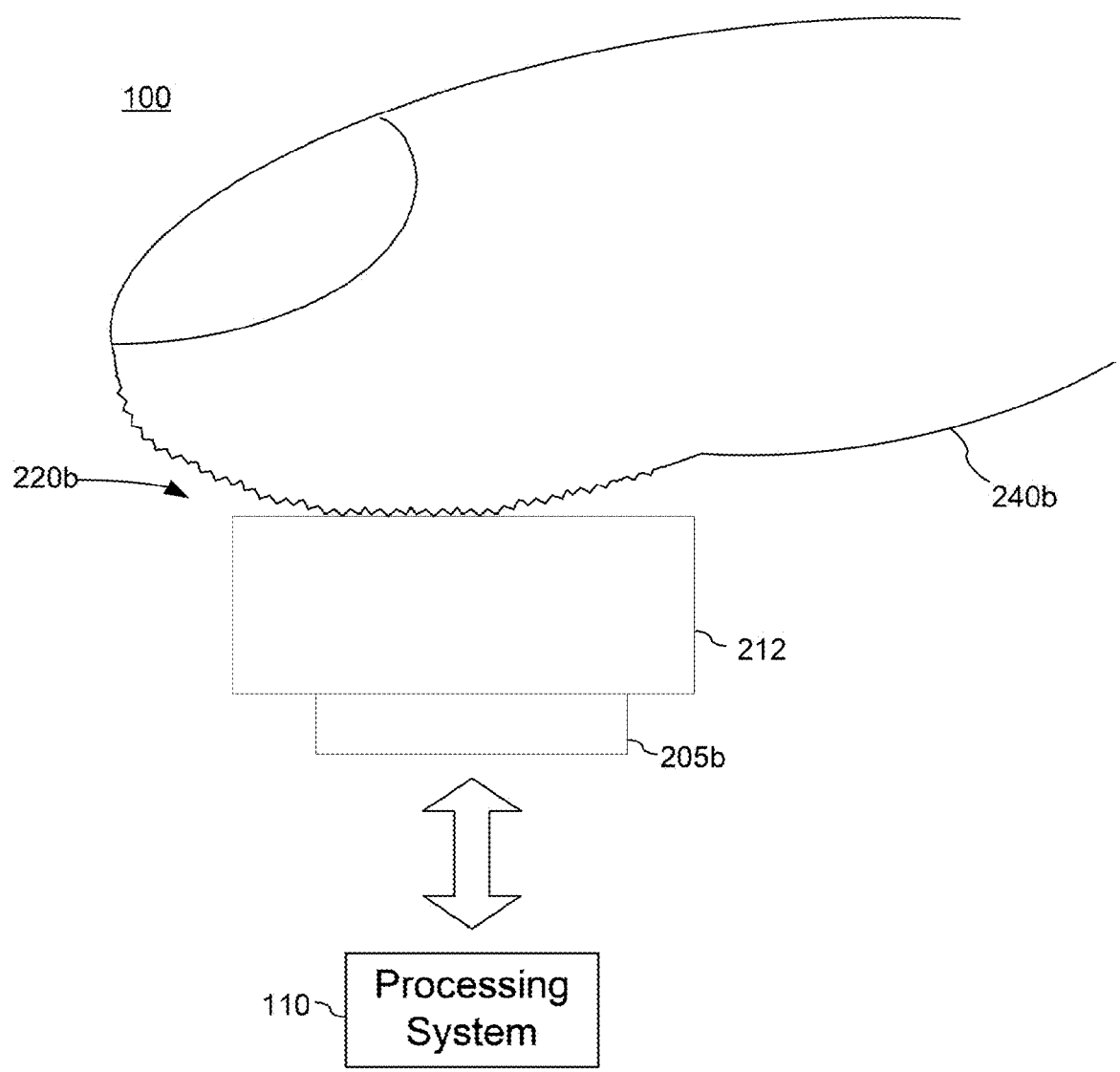
FIG. 2 is a block diagram of another example of an input device.

FIG. 2 depicts a further example of an input device 100. In FIG. 2, the input device 100 is shown as including a fingerprint sensor 205b. The fingerprint sensor 205b is configured to capture a fingerprint from a finger 240b. The fingerprint sensor 205b is disposed underneath a cover layer 212 that provides an input surface for the fingerprint to be placed or swiped over the sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a relatively high resolution capable of resolving features of a fingerprint placed on the input surface.

Figure 3:
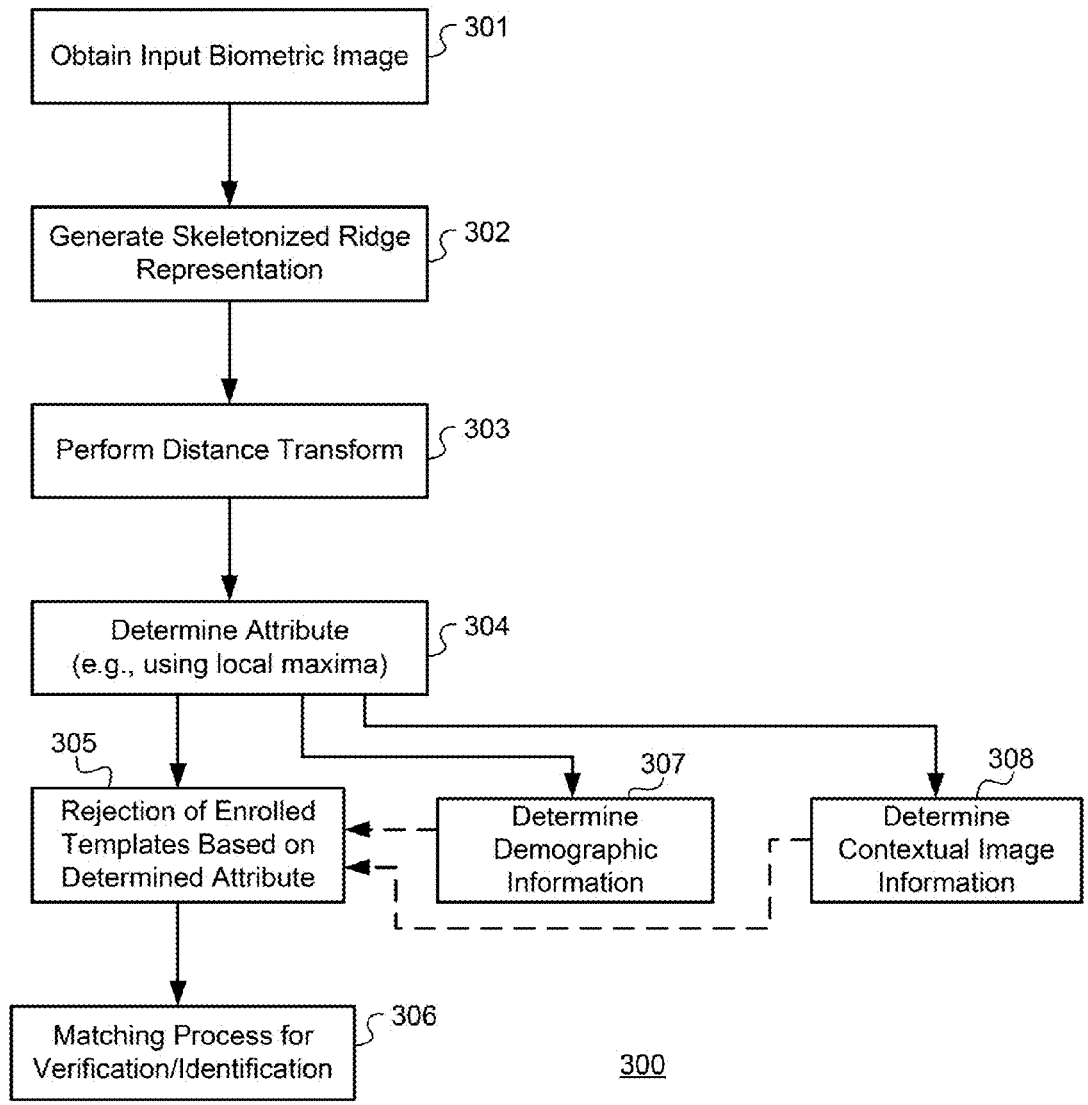
FIG. 3 is a flowchart illustrating examples of biometric input processes.

FIG. 3 is a flowchart 300 illustrating an example of biometric input processes according to various embodiments. At stage 301, an input biometric image corresponding to an input biometric object is obtained from a biometric input device such as an input device 100 discussed above with respect to FIGS. 1-2. The input biometric image may be, for example, a full or partial view of a fingerprint or some other biometric (e.g., a palm print). At stage 302, a processing system (e.g., as discussed above with respect to FIGS. 1-2) generates a feature map based on the input biometric image, such as a skeletonized ridge representation with lines corresponding to ridges in the input biometric image. At stage 303, the processing system performs a distance transform on the feature map, such as the skeletonized ridge representation, to provide a further representation, such as a distance map, of the input biometric image in terms of a distance corresponding to each pixel (e.g., providing a distance-to-nearest-ridge for each pixel).

In an example, generating a skeletonized ridge representation corresponding to the input biometric image at stage 302 includes generating a binary image from the received biometric image (e.g., by enhancing the raw image, estimating an orientation map, smoothing/enhancing along the orientation, and applying a threshold) and thinning each ridge of the binary image to a single pixel width (e.g., by applying a hit-and-miss algorithm or some variation thereof which iteratively translates predetermined patterns to each pixel and erodes the pixel if there is a "hit" or leaves the pixel if there is a "miss" until the image converges to a thin-ridge image with a single-pixel width). Then, the distance transform at stage 303 is populated by setting each pixel corresponding to a ridge as having a distance of 0, each pixel adjacent to the ridge pixels in the x-or y-directions as 1, each pixel diagonally adjacent from a ridge pixel as $\sqrt{2}$, etc. In other words, each pixel corresponding to a ridge has a distance of 0, and for every other pixel, the distance d is equal to $\sqrt{x^2+y^2}$, where x and y are the offsets in the x-and y-directions to the nearest ridge pixel.

Figure 4A:
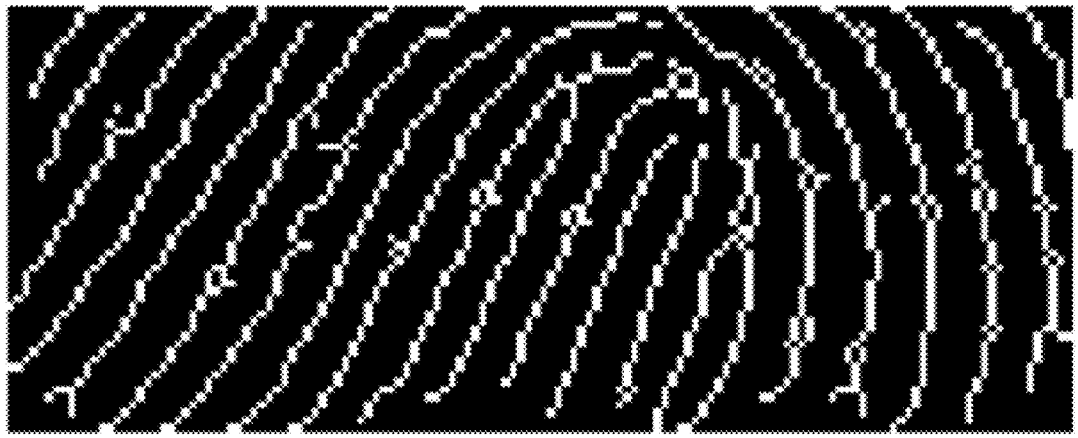
FIG. 4A depicts an example of a skeletonized ridge representation of an input biometric image (in this example of a skeletonized ridge representation, the white areas correspond to ridges in an input biometric image that have been thinned)
Figure 4B:
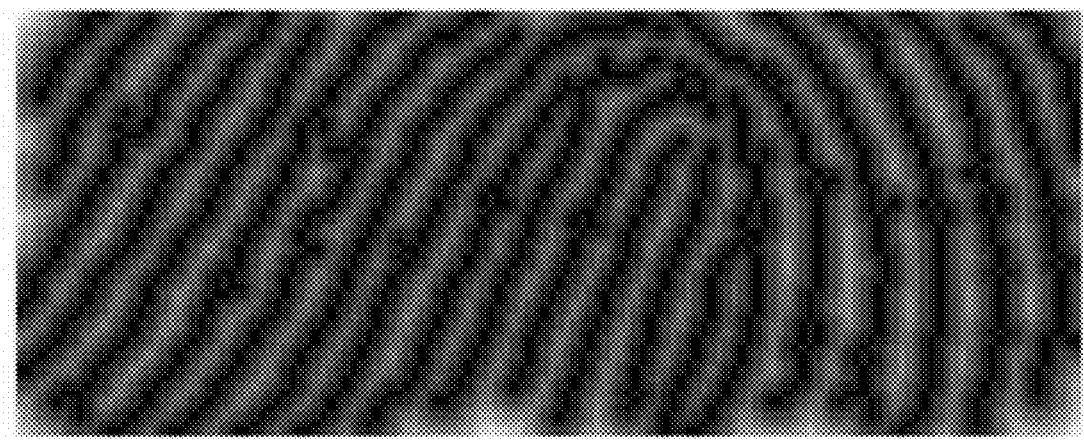
FIG. 4B depicts an example of a distance transform corresponding to the skeletonized ridge representation of FIG. 4A.

FIG. 4A depicts an example of a skeletonized ridge representation of an input biometric image. In this skeletonized ridge representation, the white areas correspond to ridges in an input biometric image that have been thinned. FIG. 4B depicts a distance transform corresponding to the skeletonized ridge representation of FIG. 4A. In the depicted distance transform, the intensity of the pixels correspond to the distance from a nearest ridge, with the lightest pixels corresponding to the pixels that are farthest from a nearest ridge and the darkest pixels corresponding to the pixels that are closest to or that form the ridges.

Turning back to FIG. 3, at stage 304, the processing system uses the distance transform performed at stage 303 to determine an attribute of the input biometric image. In an embodiment, determining the attribute includes identifying local maxima based on the performed distance transform. In an example, the local maxima are identified by considering 3×3 regions of pixels and evaluating whether the middle pixel is greater than (or greater than or equal to) the eight surrounding pixels. By considering the distance values for each 3×3 region of pixels, a distribution of local maxima for the input biometric image will be obtained.

Figure 5:
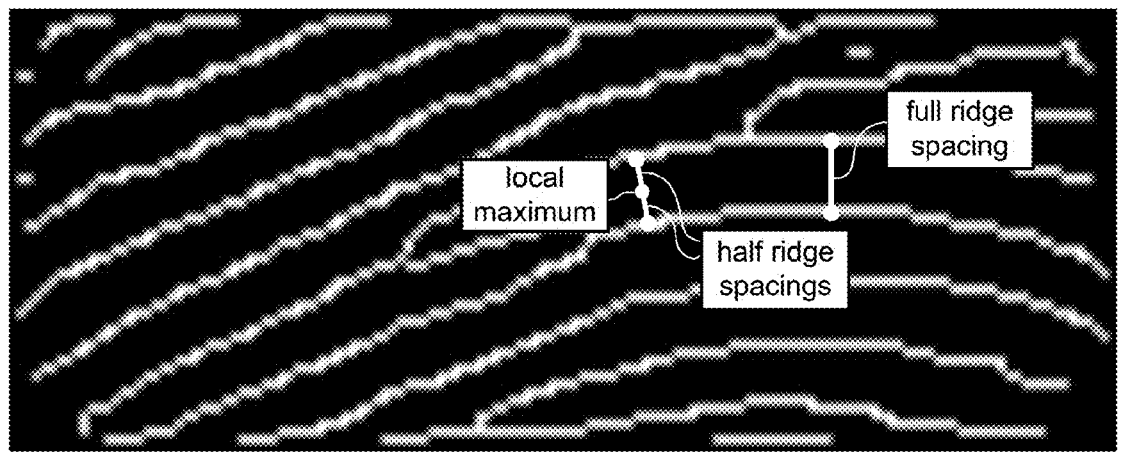
FIG. 5 depicts an annotated example of an skeletonized ridge representation with an example of an identified local maximum, as well as an example of a 3×3 grid of distance values corresponding to a 3×3 region of pixels.

FIG. 5 depicts an annotated example of a skeletonized ridge representation with an example of an identified local maximum, as well as an example of a 3×3 grid of distance values corresponding to a 3×3 region of pixels (with the local maximum as the middle pixel in the 3×3 grid). In this example, the middle pixel having a 3.61 distance value is determined to be a local maximum because all other pixels surrounding the middle pixel have distance values equal to or less than 3.61. The middle pixel having a 3.61 distance value is thus at the midpoint between two closest ridges and is a "half ridge spacing" value (whereas a "ridge spacing" is the amount of space between two ridges).

It will be appreciated that although the foregoing example uses evaluation of 3×3 regions of pixels to find local maxima, other techniques for finding local maxima may be used. For example, larger and/or differently-shaped regions of pixels may be used, as well as other algorithmic approaches. In the present example, evaluating 3×3 regions of pixels is advantageous in terms of relative simplicity and fast processing time (while not being significantly affected by noise in the skeletonized ridge representation), but in other examples, differently-sized regions or different approaches to searching for local maxima may be utilized as well.

In an embodiment, the identified local maxima provide the basis for the determined attribute for the input biometric image. In an example, a median or mean half ridge spacing value (taken from the set of all half ridge spacing values corresponding to local maxima of the input biometric image) is used as the determined attribute for the input biometric image. In another example, the distribution of half ridge spacing values is used as the determined attribute for the input biometric image, for example, by considering the range from minimum half ridge spacing value to maximum half ridge spacing value in the data set (or some other range such as 25 percentile to 75 percentile), or by considering the actual distribution of data points in terms of frequency/weighting at various values/ranges (e.g., the number of local maxima having distance values greater than or equal to 1 but less than 2, the number of local maxima having distance values greater than or equal to 2 but less than 3, the number of local maxima having distance values greater than or equal to 3 but less than 4, etc.).

In these examples, ridge spacing characteristics of a fingerprint, which are represented by the determined attribute, are useful because two fingerprint images with sufficiently different ridge spacing characteristics are highly unlikely to be a match. This is because different fingers have different ridge spacing characteristics and different areas within a single finger have different ridge spacing characteristics (e.g., the tip of a fingerprint versus the core of the fingerprint). The processing system thus utilizes the determined attribute (e.g., a median or mean half ridge spacing value, or a distribution of half ridge spacing values) to perform a preliminary rejection of enrolled templates at stage 305 to eliminate enrolled biometric images that have ridge spacing characteristics sufficiently different from the input biometric images as non-matching (or highly likely to be non-matching). The processing system at stage 305 thus compares the determined attribute of the biometric image with corresponding attributes of enrolled biometric images, and, based on the comparison, eliminates enrolled biometric images from a subsequent matching process for the biometric image performed at stage 306.

For example, if the determined attribute corresponding to the input biometric image is a mean or median half ridge spacing value, the mean or median half ridge spacing value is compared to mean or median half ridge spacing values of enrolled biometric images, and if the difference is greater than a threshold difference, the corresponding enrolled biometric images are eliminated such that a subsequent matching process (e.g., for a verification or identification operation) does not even attempt to match the input biometric image to the eliminated enrolled biometric images. In different examples, the threshold difference may be set at a relatively conservative value or less conservative value to adjust the degree to which enrolled biometric images are eliminated by the pre-match rejection process at stage 305 (e.g., setting a more conservative value may eliminate less enrolled images while setting a less conservative value may eliminate more enrolled images).

In another example, if the determined attribute corresponds to a distribution of half ridge spacing values, the processing system evaluates the difference between the data set corresponding to the input biometric image and corresponding data sets corresponding to enrolled biometric images. This may, for example, involve comparing a range of half ridge spacing values corresponding to the input biometric image with corresponding ranges of enrolled biometric images (e.g., comparing a min-max difference for the input biometric image to a min-max differences for enrolled biometric images), or involve comparing the entire data sets based on frequency of local maxima corresponding to particular half ridge spacing values or ranges or the manner in which the half ridge spacing values are weighted within the overall distribution of half ridge spacing values. Based on the comparison results, enrolled biometric images are eliminated when the attributes of the enrolled biometric images are sufficiently far apart from the determined attribute of the input biometric images. It will be appreciated that, when comparing distributions, a standard measure that behaves like a "distance" between the distributions may be used. One particular example includes representing the distribution as a histogram of values and computing the intersection of two histograms as the minimum value for each bin of the two histograms.

It will be appreciated that different types of determined attributes based on the local maxima may be particularly suitable for different situations. For example, for a large fingerprint sensor, there is likely to be a larger distribution of half ridge spacing values due to the input biometric image corresponding to a relatively large area of a fingerprint, while for a small fingerprint sensor, there is likely to be a tighter distribution of half ridge spacing values. Thus, for a low entropy distribution where an input biometric image corresponds to a relatively small area of a fingerprint, it may be sufficient to rely on the mean or median half ridge spacing value to provide for fast rejection. On the other hand, for higher entropy distribution where the input biometric image corresponds to a relatively larger area of the fingerprint, it may be more effective to utilize a comparison between distributions to provide for fast rejection It will further be appreciated that the determined attributes based on the local maxima discussed above are exemplary, and that other parameters or sets of parameter based on the local maxima may also be used to provide the basis for the rejection of enrolled templates based on the determined attribute at stage 305. It will further be appreciated that although the foregoing examples discuss the local maxima in terms of a "half ridge spacing" value, it will be appreciated that other ridge spacing-related values may be used as well, such as the full ridge spacing value, as well as other representations of the ridge spacing characteristics obtainable from a biometric image, a skeletonized ridge representation, and/or a distance transform.

Following the preliminary or "pre-match" rejection of enrolled templates at stage 305, the processing system performs a matching process for verification or identification at stage 306 utilizing a relatively smaller universe of enrolled templates, allowing for lower latency associated with the matching process for verification or identification. The matching process at stage 306 may include comparison of the biometric image to remaining enrolled biometric images based on one or more attributes of the biometric image other than the determined attribute. For example, the matching process 306 may include computation of a match score based on a distance measure between features of the input image and features of the enrollment template, wherein the features may be, for example, point-based features such as minutia points, ridge flows, and ridge skeletons.

The processing system may then provide a verification or identification result based on the result of the matching process at stage 306 (e.g., successful verification leading to a granting of access, unsuccessful verification leading to denial of access, successful identification leading to output of an identification result, or unsuccessful identification leading to a notification that identification failed).

It will be appreciated that the preliminary rejection of enrolled templates based on the determined attribute at stage 305 may be used instead of or in combination with other preliminary rejection techniques, including for example, rejection techniques for partial images of fingerprints (e.g., eliminating enrolled templates based on distinguishing a core of a fingerprint from a tip of a fingerprint based on other attributes determined from the input biometric image) and rejection techniques for full fingerprint images (e.g., eliminating enrolled templates based on distinguishing a "left loop" fingerprint from a "tented arch" fingerprint). In certain embodiments, by using multiple preliminary rejection techniques together, including the preliminary rejection of enrolled templates based on the determined attribute at stage 305, the universe of enrolled biometric images for the matching process at stage 306 is reduced even further.

In other embodiments, the processing system may utilize the determined attribute for other applications, including the determination of demographic information at stage 307 and/or the determination of contextual image information at stage 308.

At stage 307, the processing system utilizes correlations between age/gender/ethnicity and ridge spacing to determine likely age(s), gender and/or ethnicity(ies) corresponding to the input biometric image. Ridge spacing for fingerprints in men and women in general, in different ethnic groups, and for individuals of different ages are sufficiently different that potential age(s), gender and/or ethnicity(ies) may be identified based on the determined attribute. In some instances, a definite identification of a particular age or ethnicity may not be possible, but it may be possible to identify multiple possible ages or ethnicities while eliminating others based on the determined attribute (e.g., women vs. men, children vs. adults, Asian vs. Caucasian, etc.).

The determined demographic information may also be used or output by the processing system for various purposes in addition to the rejection of enrolled templates based on the determined demographic information including, for example, reporting on usage statistics and targeted advertising.

At stage 308, the processing system utilizes correlations between particular fingers or localizations within a finger to determine likely finger(s) or localization(s) corresponding to the input biometric image. Generally speaking, for any person, the ridge spacing for a person drops going from the thumb to the fifth digit, and for any particular finger, the core generally has smaller spacing than the borders (tip, sides, bottom). Thus, for example, because the ridge spacing for a thumb is sufficiently different from the ridge spacing for an index finger, a middle finger, a ring finger and a fifth digit, an input biometric image corresponding to a full or partial view of a fingerprint may be identified as corresponding to the thumb based on the determined attribute. Similarly, because the ridge spacing for a partial view of a core of a fingerprint is sufficiently different from (i.e., smaller than) the ridge spacing for a tip or a base of a fingerprint, an input biometric image corresponding to a partial view of a fingerprint may be identified as corresponding to a core.

In yet another embodiment, the determined demographic information from stage 307 and/or the determined contextual image information from stage 308 may be used as preliminary rejection criteria at stage 305. For example, instead of or in addition to directly comparing the determined attribute corresponding to the input biometric image with corresponding attributes of enrolled biometric images at stage 305, the determined demographic information (e.g., age, gender and/or ethnicity) and/or the determined contextual image information (e.g., the identified finger(s) and/or localization(s)) may be compared with demographic information and/or contextual image information corresponding to the enrolled biometric images. In an embodiment, all enrolled views corresponding to a particular finger (e.g., thumb, index, middle, etc.) or a localization type (e.g., tip, core, etc.) can be rejected right off the bat without doing individualized comparisons of the determined attribute to corresponding attributes of enrolled views for that finger type or localization type.

In a further embodiment, stage 305 may include—in addition to or instead of rejecting enrolled templates—prioritizing enrolled templates based on the determined attribute from stage 304 (and/or based on the determined demographic information from stage 307 and/or the determined contextual image information from stage 308) to optimize a sequence in which the matching process at stage 306 compares the input biometric image to enrolled biometric images. For example, the processing system may first compare the input biometric image to enrolled biometric images having attributes relatively more similar to the determined attribute corresponding to the input biometric image (since these enrolled biometric images are more likely to be a match). After the enrolled biometric images having relatively similar attributes have been compared, the input biometric image is compared to enrolled biometric images having attributes relatively less similar to the determined attribute corresponding to the input biometric image. Likewise, in another example, the processing system may prioritize enrolled biometric images having age, gender, and/or ethnicity information similar to the input biometric image or having contextual image information similar to the input biometric image over those with dissimilar age, gender, and/or ethnicity information or dissimilar contextual image information.

Figure 6:
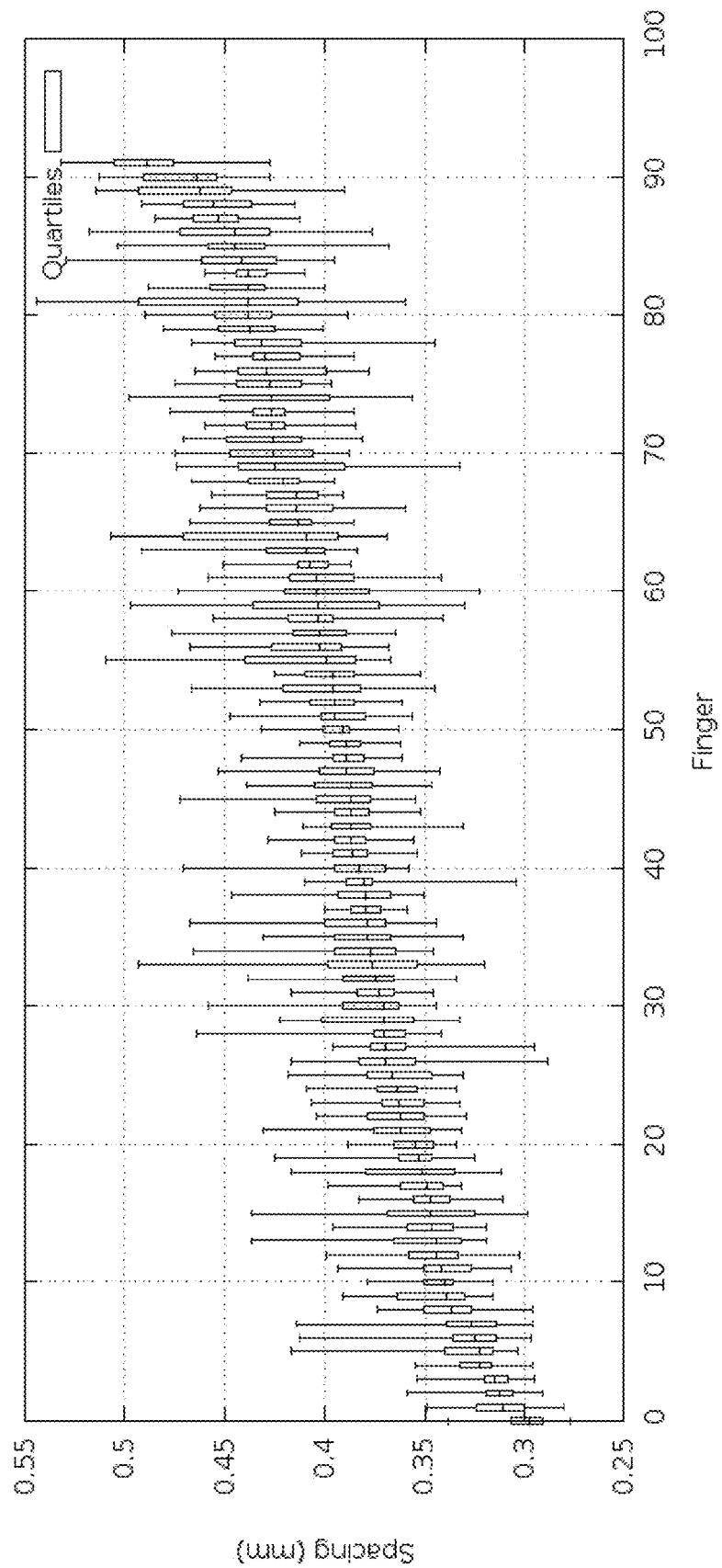
FIG. 6 is a plot illustrating an example of a distribution of determined attributes relating to ridge spacing for 92 fingers.

FIG. 6 is a plot illustrating an example of a distribution of determined attributes relating to ridge spacing for 92 fingers (the data corresponding to each finger is based on an aggregation of partial views corresponding to that finger). The data in the plot has been arranged from lowest median spacing to highest median spacing, which in this example corresponds to full ridge spacing. As can be seen from this plot, there are substantial variations between the ridge spacings between different fingers, allowing for excellent results when using a determined attribute related to ridge spacing for a preliminary rejection of enrolled templates. Further, it will be appreciated that aggregation of the ridge spacing data for an entire finger may allow for a fast rejection of all enrolled views corresponding to that finger (for example, if the minimum ridge spacing for an input biometric image is greater than the maximum ridge spacing for the finger across all aggregated views for the finger, it can be determined that the input biometric image will not match any enrolled images for the finger).

In one example, using the determined attribute related to ridge spacing to perform preliminary rejection on an exemplary data set yielded an approximately 25% rejection rate (i.e., allowing for approximately 25% of the enrolled views to be eliminated from a subsequent matching processing based on the preliminary rejection).

It should be understood that while certain embodiments are described in the context of a fully functioning apparatus, the mechanisms described herein are capable of being distributed as a program product (e.g., software) in a variety of forms. For example, the mechanisms may be implemented and distributed as a software program on information bearing media that are readable by electronic processors (e.g., non-transitory computer-readable and/or recordable/writable information bearing media readable by the processing system 110). Additionally, other types of media may be used to carry out the distribution. Examples of non-transitory, electronically readable media include various discs, memory sticks, memory cards, memory modules, and the like. Electronically readable media may be based on flash, optical, magnetic, holographic, or any other storage technology.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A biometric input system, comprising:
    a biometric sensor, configured to generate a biometric image comprising features of an input biometric object; and
    a processing system, configured to receive the biometric image, generate a feature map from the biometric image, perform a distance transform on the feature map, and determine an attribute of the biometric image from the distance transform;
    wherein the processing system is further configured to compare the determined attribute of the biometric image with corresponding attributes of enrolled biometric images, and, based on the comparison, to eliminate enrolled biometric images from a matching process for the biometric image, wherein the matching process is performed after the elimination and comprises comparison of the biometric image to remaining enrolled biometric images based on one or more attributes of the biometric image other than the determined attribute.

2. The system according to claim 1, wherein the input biometric object is a fingerprint, and the feature map is a skeletonized ridge representation of the fingerprint.

3. The system according to claim 2, wherein generating the feature map from the biometric image comprises:
generating a binary image from the received biometric image; and
thinning each ridge of the binary image to a single pixel width.

4. The system according to claim 2, wherein the performed distance transform indicates a distance-to-nearest-ridge for each pixel of the feature map.

5. The system according to claim 4, wherein determining the attribute of the biometric image from the distance transform further comprises:
identifying local maxima based on the performed distance transform; and
determining the attribute of the biometric image based on the identified local maxima.

6. The system according to claim 5, wherein the determined attribute comprises a median or mean half ridge spacing value.

7. The system according to claim 5, wherein the determined attribute comprises a distribution of half ridge spacing values.

8. The system according to claim 1, wherein the processing system is further configured to determine an age, gender, or ethnicity corresponding to the input biometric object based on the determined attribute.

9. A biometric input method, comprising:
obtaining, by a processing system, a biometric image of an input biometric object;
generating, by the processing system, a skeletonized ridge representation of the input biometric object based on the obtained biometric image;
performing, by the processing system, a distance transform on the skeletonized ridge representation to determine a distance-to-nearest-ridge for each pixel of the skeletonized ridge representation;
identifying local maxima based on the performed distance transform; and
determining an attribute of the biometric image based on the performed distance transform and the identified local maxima.

10. The method according to claim 9, further comprising:
comparing, by the processing system, the determined attribute of the biometric image with corresponding attributes of enrolled biometric images;
eliminating, by the processing system, based on the comparing, enrolled biometric images from a matching process for the biometric image; and
performing, by the processing system, the matching process for the biometric image, wherein performing the matching process comprises comparing one or more attributes of the biometric image other than the determined attribute to enrolled biometric images remaining after the elimination.

11. The method according to claim 9, wherein the obtained biometric image is a full or partial view of a fingerprint, and wherein the method further comprises:
identifying one or more fingers corresponding to the obtained biometric image based on the determined attribute.

12. The method according to claim 9, wherein the obtained biometric image is a partial view of a fingerprint, and wherein the method further comprises:
determining a localization of the partial view of the fingerprint within the fingerprint based on the determined attribute.

13. The method according to claim 9, further comprising:
determining an age, gender, or ethnicity corresponding to the input biometric object based on the determined attribute.

14. The method according to claim 9, wherein the determined attribute is based on a ridge spacing-related value or a distribution of ridge spacing-related values.

15. A non-transitory, computer-readable medium having processor-executable instructions stored thereon for biometric input, the processor-executable instructions, when executed, facilitating performance of the following:
generating a skeletonized ridge representation of an input biometric image corresponding to an input biometric object;
performing a distance transform on the skeletonized ridge representation to determine a distance-to-nearest-ridge for each pixel of the skeletonized ridge representation;
identifying local maxima based on the performed distance transform; and
determining an attribute of the biometric image based on the performed distance transform and the identified local maxima.

16. The non-transitory, computer-readable medium according to claim 15, wherein the processor-executable instructions, when executed, further facilitate:
comparing the determined attribute of the biometric image with corresponding attributes of enrolled biometric images;
eliminating, based on the comparing, enrolled biometric images from a matching process for the biometric image; and
performing the matching process for the biometric image, wherein performing the matching process comprises comparing one or more attributes of the biometric image other than the determined attribute to enrolled biometric images remaining after the elimination.

17. The non-transitory, computer-readable medium according to claim 15, wherein the obtained biometric image is a full or partial view of a fingerprint, and wherein the processor-executable instructions, when executed, further facilitate:
identifying one or more fingers corresponding to the obtained biometric image based on the determined attribute.

18. The non-transitory, computer-readable medium according to claim 15, wherein the obtained biometric image is a partial view of a fingerprint, and wherein the processor-executable instructions, when executed, further facilitate:
determining a localization of the partial view of the fingerprint within the fingerprint based on the determined attribute.

19. The non-transitory, computer-readable medium according to claim 15, further comprising:
determining an age, gender, or ethnicity corresponding to the input biometric object based on the determined attribute.

20. The non-transitory, computer-readable medium according to claim 15, wherein the determined attribute is based on a ridge spacing-related value or a distribution of ridge spacing-related values.

* * * * *